(No Model.)
E. B. WOOD.
HOG TROUGH.
No. 364,327.  Patented June 7, 1887.
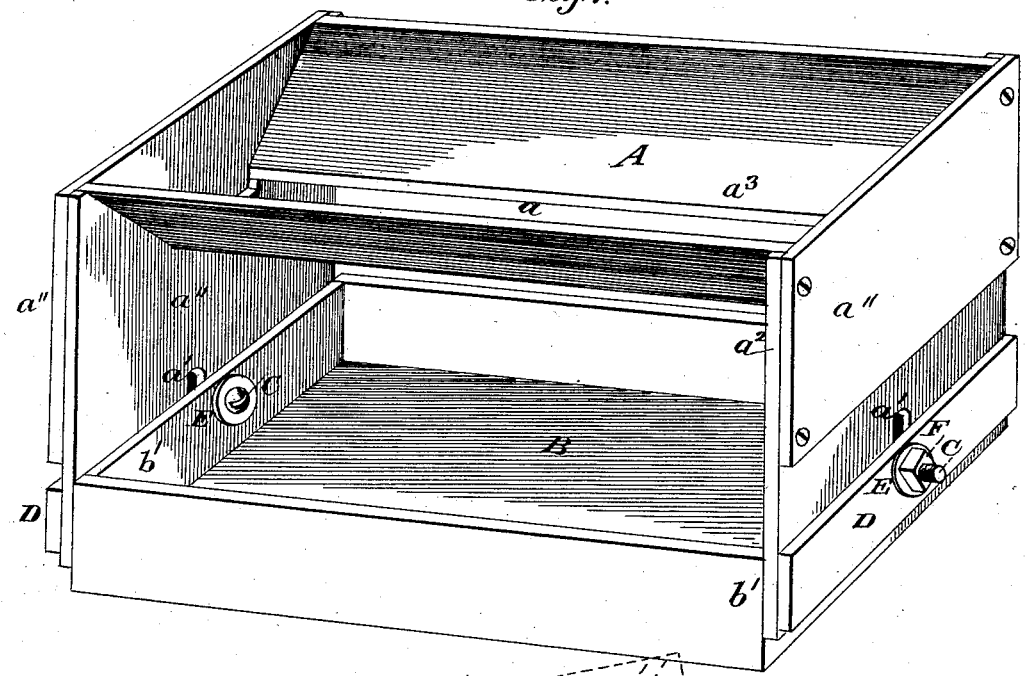
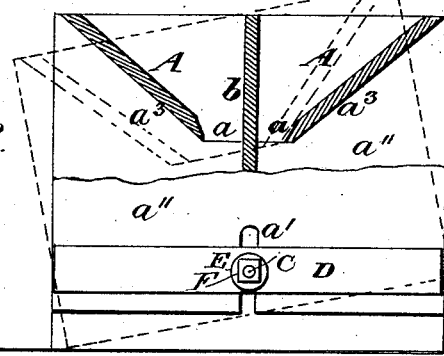
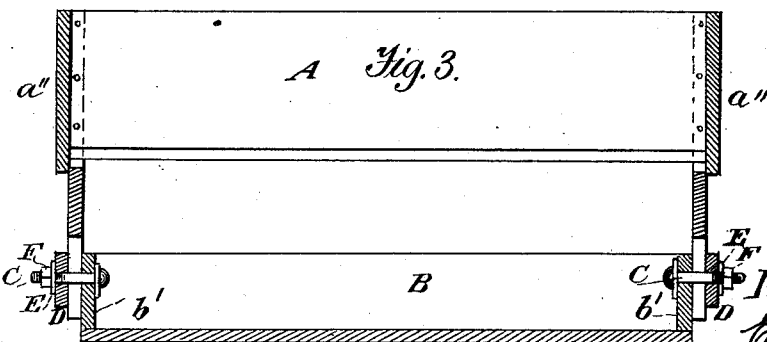
Witnesses.
A. Ruppert.
S. F. Emley.
Inventor.
Ellis B. Wood
Per
Thomas P. Simpson
N. PETERS, Photo-Lithographer, Washington, D. C.

UNITED STATES PATENT OFFICE.

ELLIS B. WOOD, OF VAN ORIN, ILLINOIS.

HOG-TROUGH.

SPECIFICATION forming part of Letters Patent No. 364,327, dated June 7, 1887.

Application filed January 31, 1887. Serial No. 225,997. (No model.)

*To all whom it may concern:*

Be it known that I, ELLIS B. WOOD, a citizen of the United States, residing at Van Orin, in the county of Bureau and State of Illinois, have invented a certain new and useful Improvement in Hog-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a feeding-trough for hogs, shoats, and pigs of such construction that the feeder may readily manipulate it when feeding them, so that neither large nor small ones can get their feet into the trough, while any may be excluded.

Figure 1 of the drawings is an elevation in perspective; Fig. 2, an end elevation partly in section, and Fig. 3 a longitudinal vertical section.

B is a rectangular feed-trough having apertures in its ends $b'$. A is a hopper consisting of the end boards, $a^2$, and converging side boards, $a^3$, so placed as to leave the longitudinal opening $a$, to permit the feed to pass into the trough. The hopper is of sufficient length to permit the end boards to embrace the ends of the trough, the lower ends of the end boards being provided with the vertical slots $a'$. Screws C are passed through the apertures in the ends of the trough and the slots $a^2$ of the hopper. Washers E are placed upon the screws, and the clamping-nuts F are turned to secure the hopper in place upon the trough.

Cross-boards D, having apertures to register with the apertures in the ends of the trough, may be provided, if desired, as also a partition, $b$, as shown in Fig. 2 of the drawings; but these are not essential to my invention.

By this construction the hopper can be raised and lowered upon the trough and tilted to admit hogs of different sizes to the trough, as may be desired.

Having thus described my invention, what I do claim as new, and desire to protect by Letters Patent, is—

The combination, with a rectangular trough having apertures in its ends, of a hopper above the trough, its end boards embracing the ends of the trough and provided with slots in their lower ends, screws passing through the apertures and slots, and clamping-nuts for adjustably securing the hopper to the trough, substantially as described, and for the purpose set forth.

In testimony whereof I affix my signature in presence of two witnesses.

ELLIS B. WOOD.

Witnesses:
M. BUHLER,
B. B. FRARY.